United States Patent [19]
Cleaveland

[11] 4,012,609
[45] Mar. 15, 1977

[54] CIRCUIT-INTERRUPTERS USING SPACED-APART BARS FOR CONDUCTOR-ASSEMBLIES

[75] Inventor: Charles M. Cleaveland, Irwin, Pa.

[73] Assignee: Westinghouse Electric Corporation, Pittsburgh, Pa.

[22] Filed: Aug. 19, 1974

[21] Appl. No.: 498,499

Related U.S. Application Data

[63] Continuation of Ser. No. 308,370, Nov. 21, 1972, abandoned.

[52] U.S. Cl. .................... 200/50 AA; 174/150; 200/48 R; 361/336
[51] Int. Cl.$^2$ .............. H01H 9/00; H02B 1/00; H01B 17/06
[58] Field of Search ........ 200/48 R, 48 KB, 50 AA, 200/144 R, 146 R; 317/103, 99, 112; 174/138 R, 150

[56] References Cited

UNITED STATES PATENTS

| | | | |
|---|---|---|---|
| 2,085,792 | 7/1937 | Cornell et al. | 200/48 KB |
| 2,625,628 | 1/1953 | Wood | 317/103 |
| 2,735,042 | 2/1956 | Hayford et al. | 317/99 |
| 2,739,205 | 3/1956 | Florschutz et al. | 317/103 |
| 2,787,690 | 4/1957 | Fallows | 200/48 KB |
| 2,840,653 | 6/1958 | Caswell | 200/50 AA |
| 2,935,548 | 5/1960 | Kozinski | 174/138 R X |
| 3,004,116 | 10/1961 | Griscom | 200/48 R |
| 3,356,799 | 12/1967 | Ortwig et al. | 200/48 KB |
| 3,538,279 | 11/1970 | Bottonari | 200/144 R |
| 3,562,459 | 2/1971 | Bould et al. | 200/146 R |
| 3,579,045 | 5/1971 | Keogh et al. | 200/50 AA X |
| 3,603,753 | 9/1971 | Frink | 200/50 AA X |
| 3,657,495 | 4/1972 | Charamel et al. | 200/48 R X |
| 3,783,208 | 1/1974 | Davies et al. | 200/50 AA |
| 3,793,494 | 2/1974 | Cleaveland | 200/50 AA |

*Primary Examiner*—James R. Scott
*Attorney, Agent, or Firm*—W. R. Crout

[57] ABSTRACT

An improved circuit-interrupter is provided using rectangular bars for the power conductor assemblies, and having the material of the bars, and the number and thickness thereof, determine the current-rating capability of the equipment, for example, 1200 amperes, 2000 amperes or 3000 amperes, for example. Standoff insulating insulators, such as porcelain insulators, are preferably utilized for supporting the power conductor-assemblies, or power bus-bar assemblies, in spaced-apart relationship within the equipment.

The movable contact-bridging assembly comprises spaced conducting contact-blades with the number thereof, and material dependent upon the current rating of the device. The configuration of the contact blades, comprising the movable bridging contact assemblies, is preferably such that slight lateral width of the movable contact assembly is necessary, for accommodating the usual operating-rod when rotation of the movable assembly is desired to effect the movement thereof from the operating mechanism. Standard-type arc-chute assemblies may be consequently utilized, because of such reduced lateral width required for the aforesaid movable contact assembly, when the latter is rotated.

For supporting purposes, it is desirable, although not absolutely necessary, to utilize pairs of laterally-spaced standoff insulators to reduce the cost and quantity of insulating material required, having mounting bolts cast therein, to support the power conductor-assemblies, or bus-bar assemblies in spaced-apart relationship. More specifically, a set of spaced-apart standoff insulators may be utilized to space the lower power bus-bar conductor assembly away from the grounded metallic base of the respective pole-unit, and another set of standoff insulators between the lower and upper conductor assemblies to support the upper conductor.

18 Claims, 34 Drawing Figures

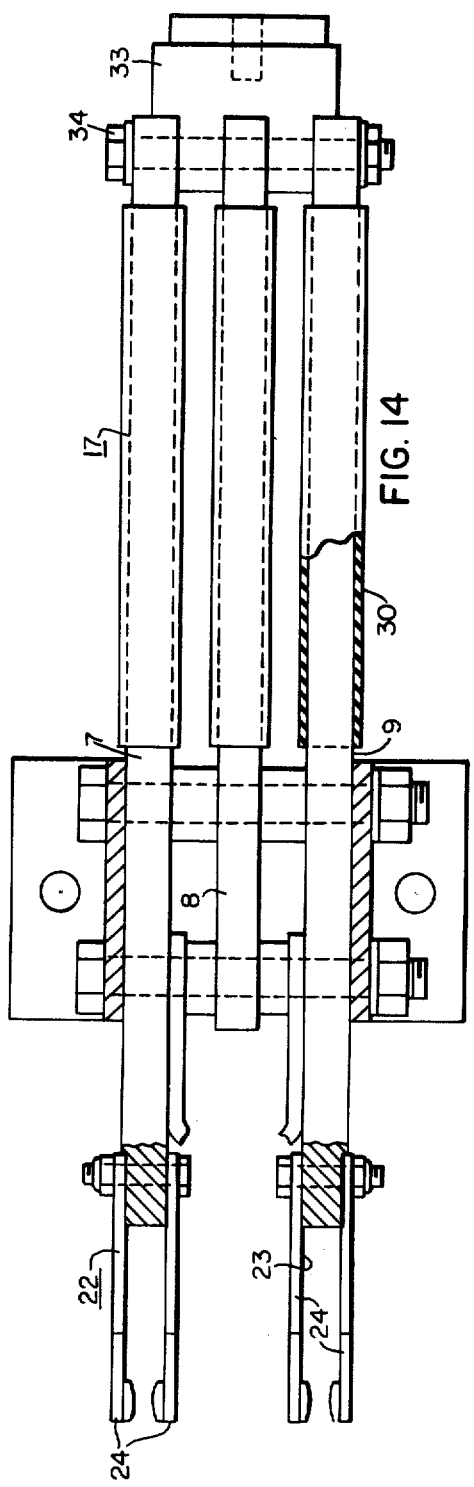
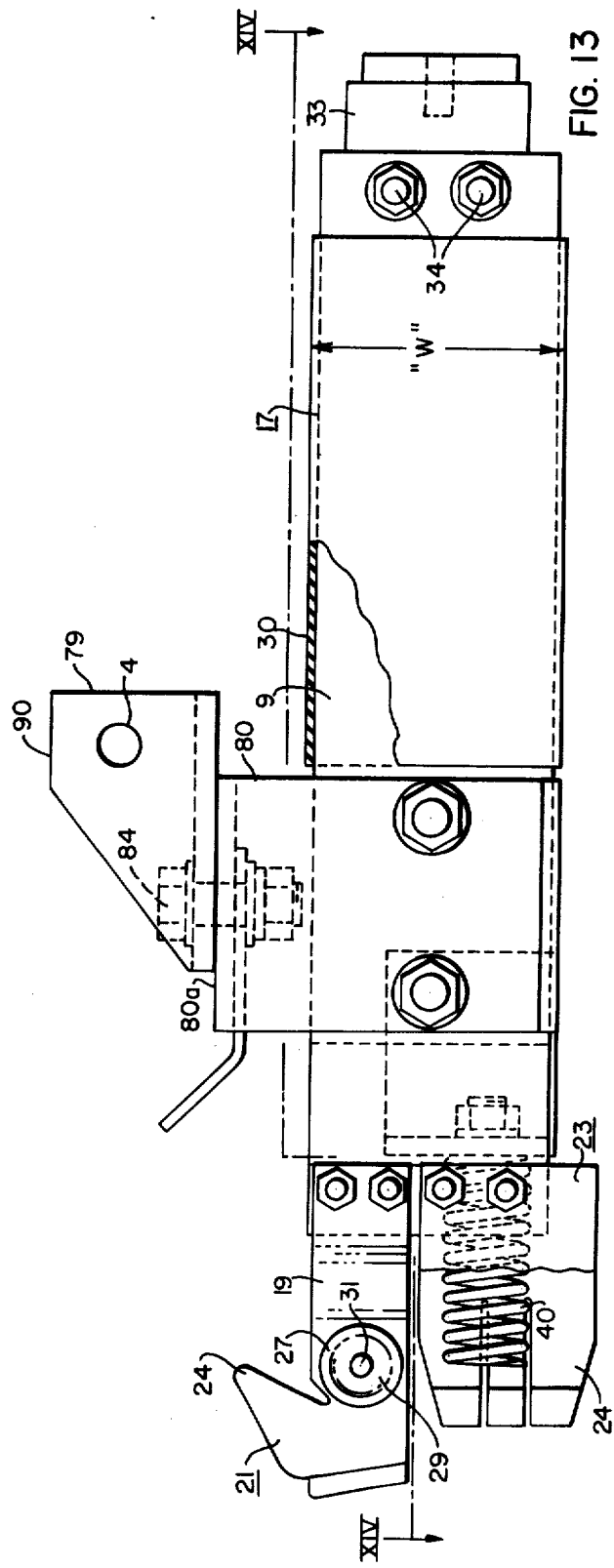

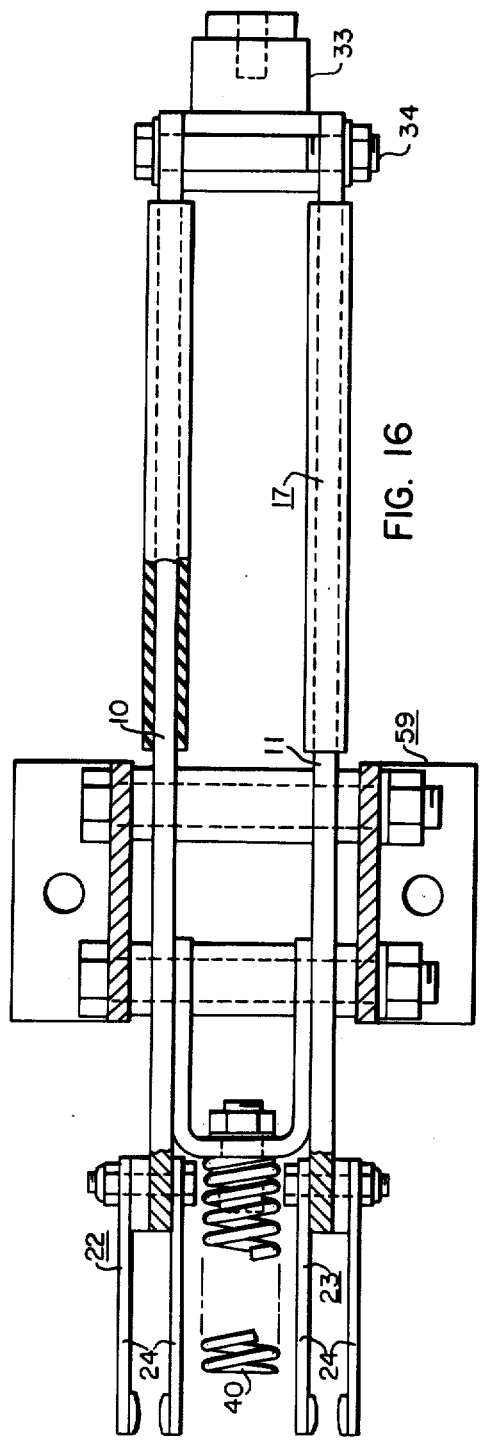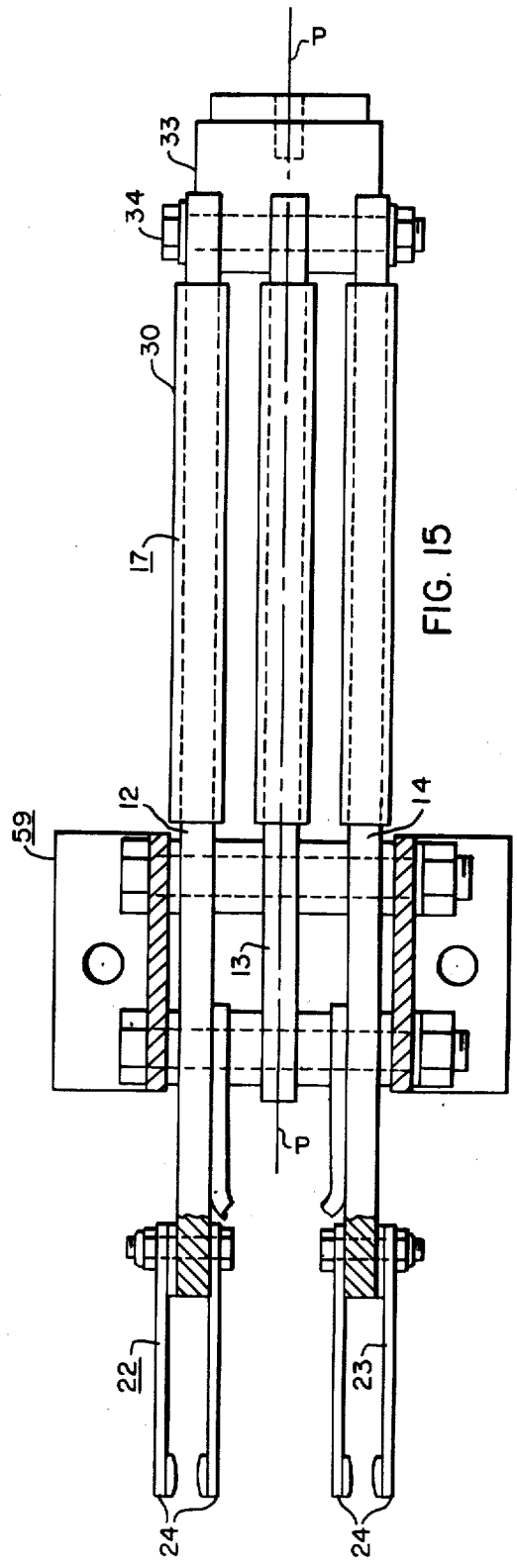

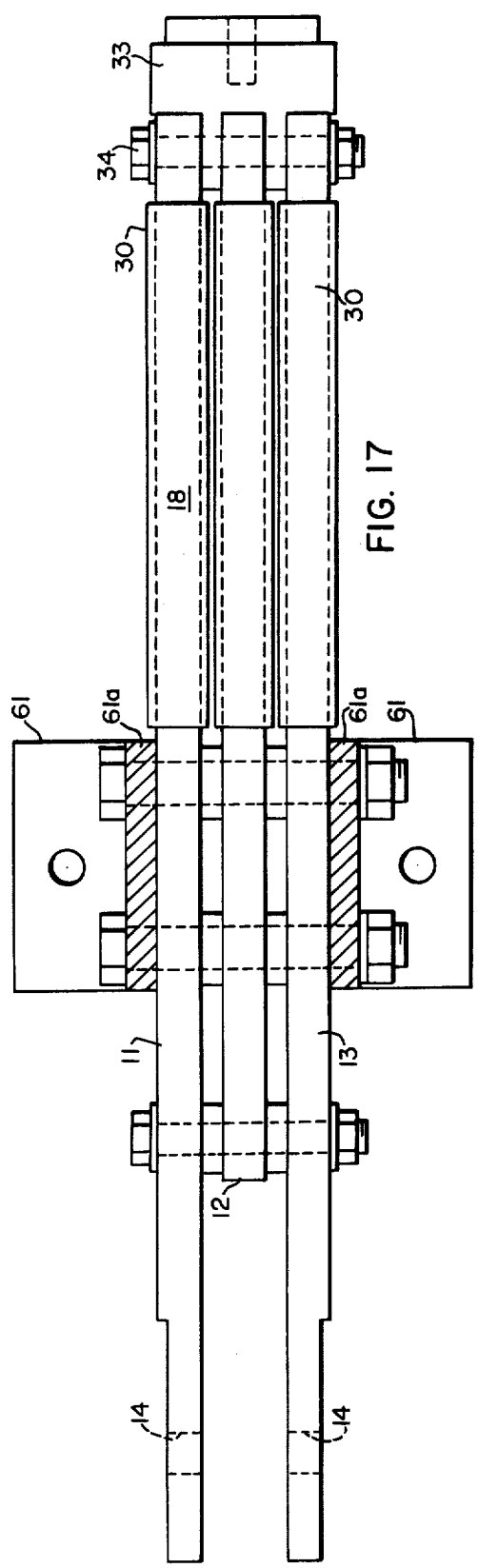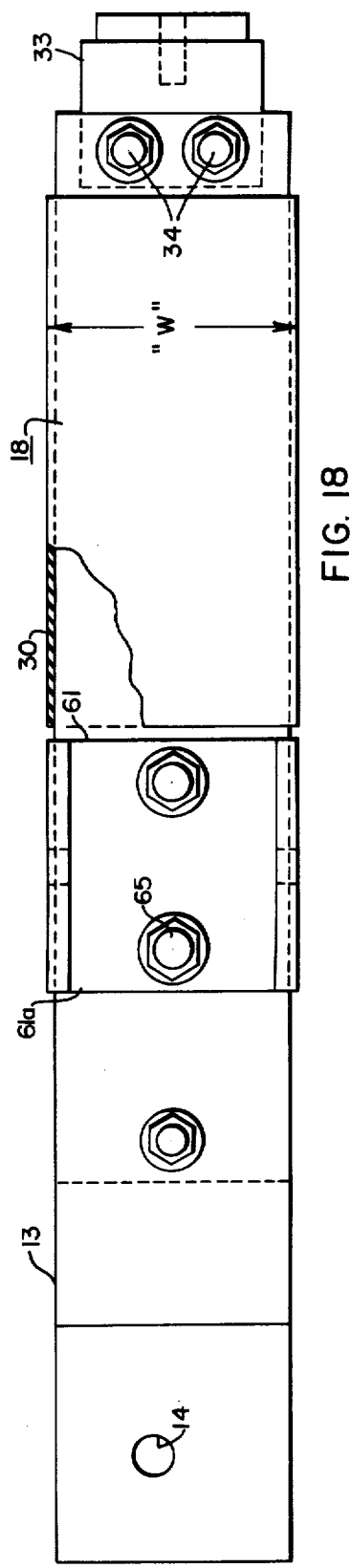
FIG. 17
FIG. 18

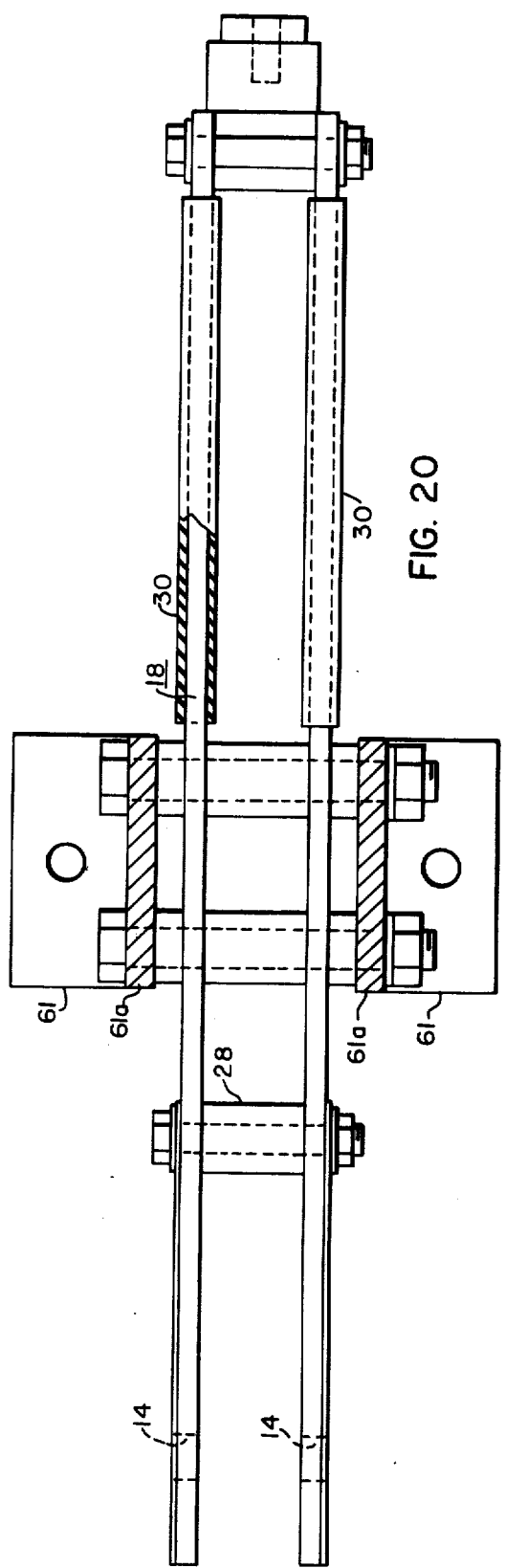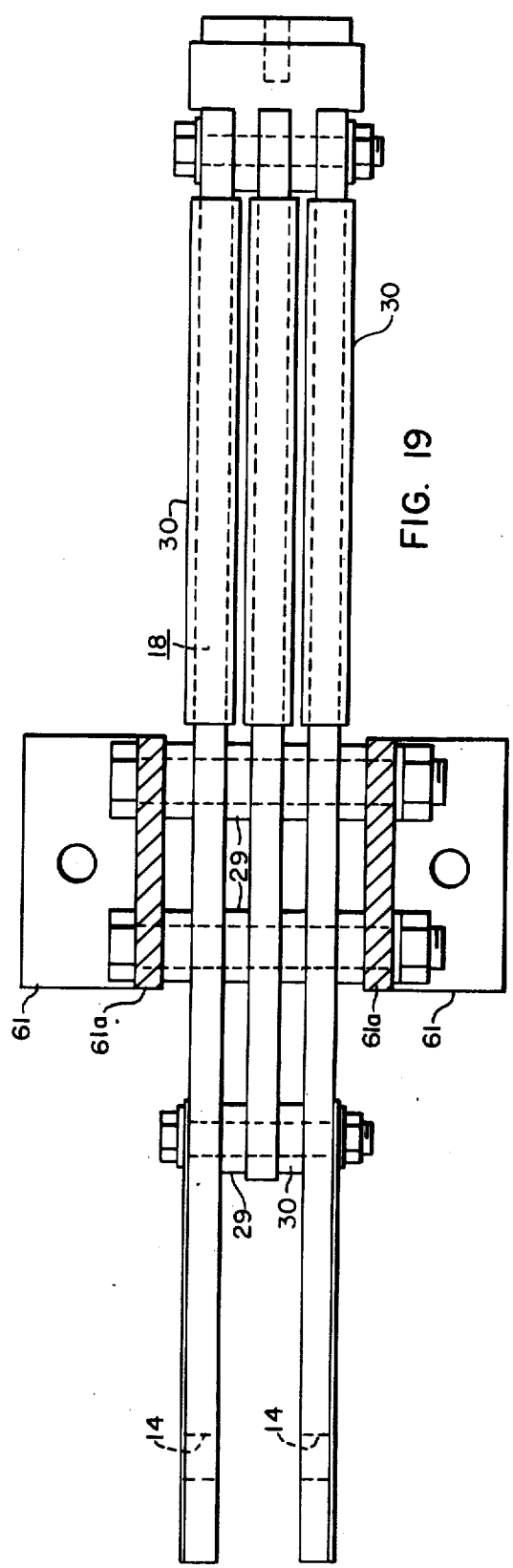

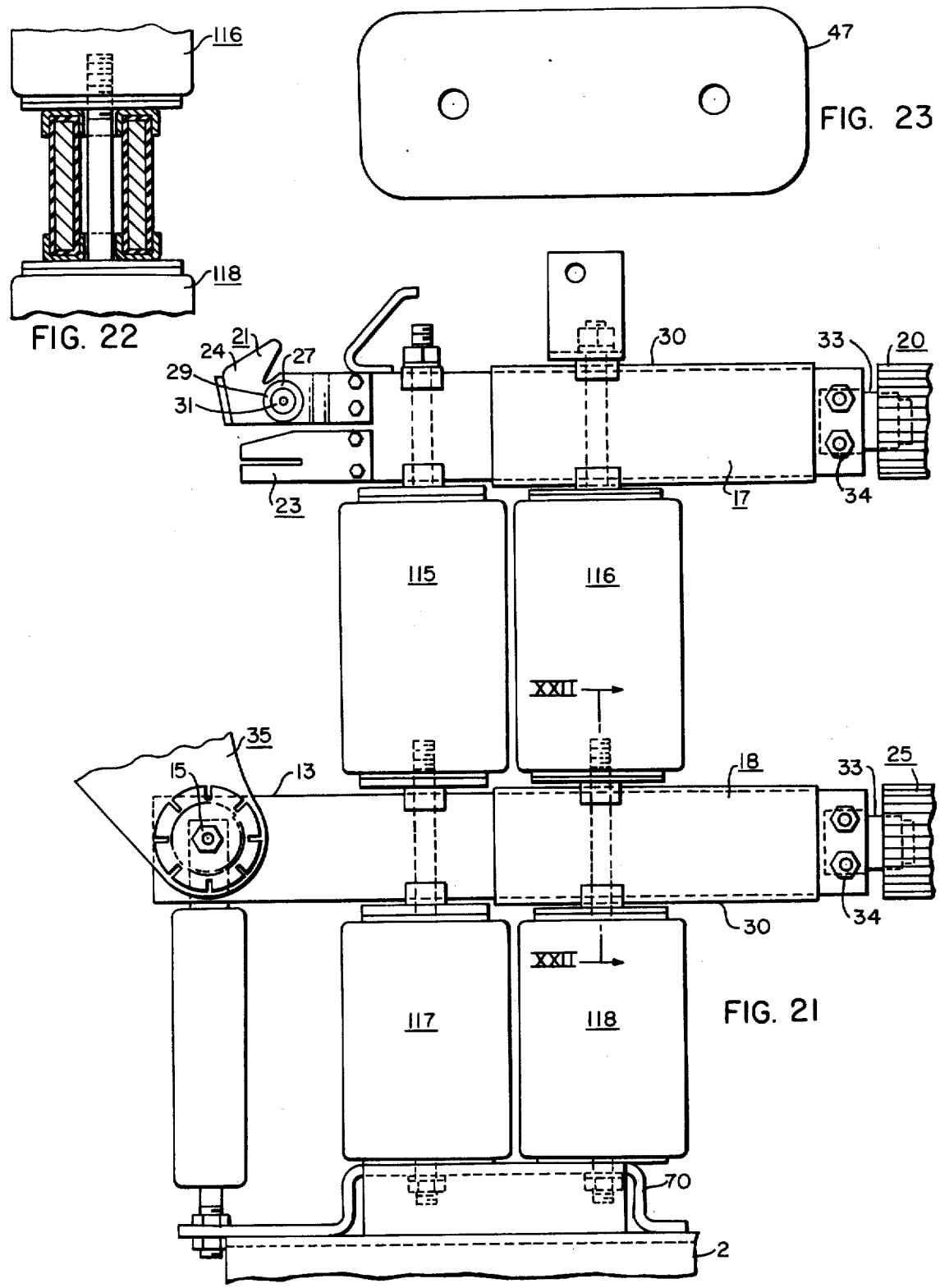

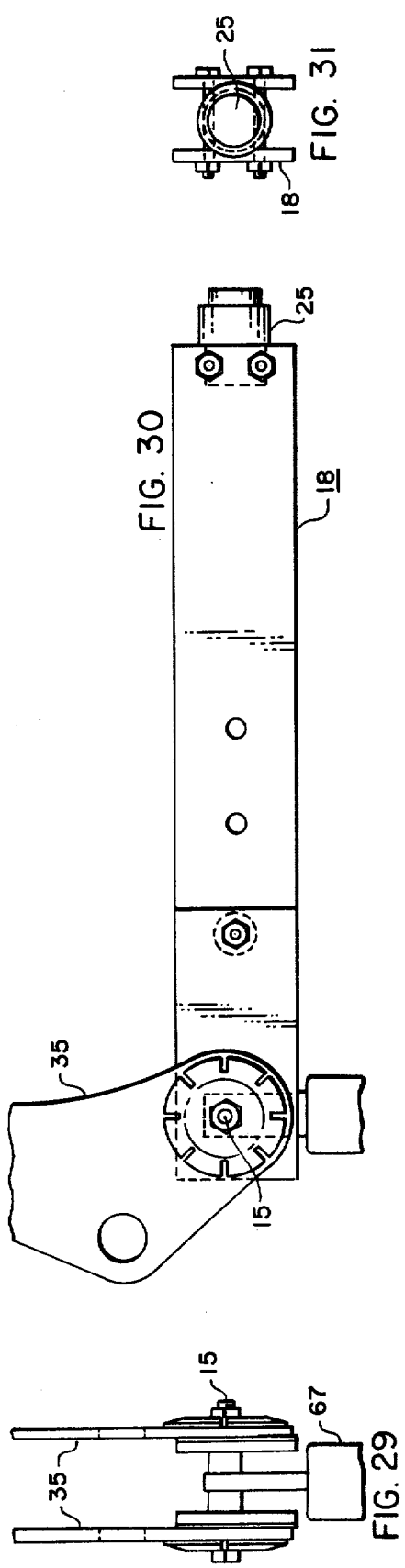
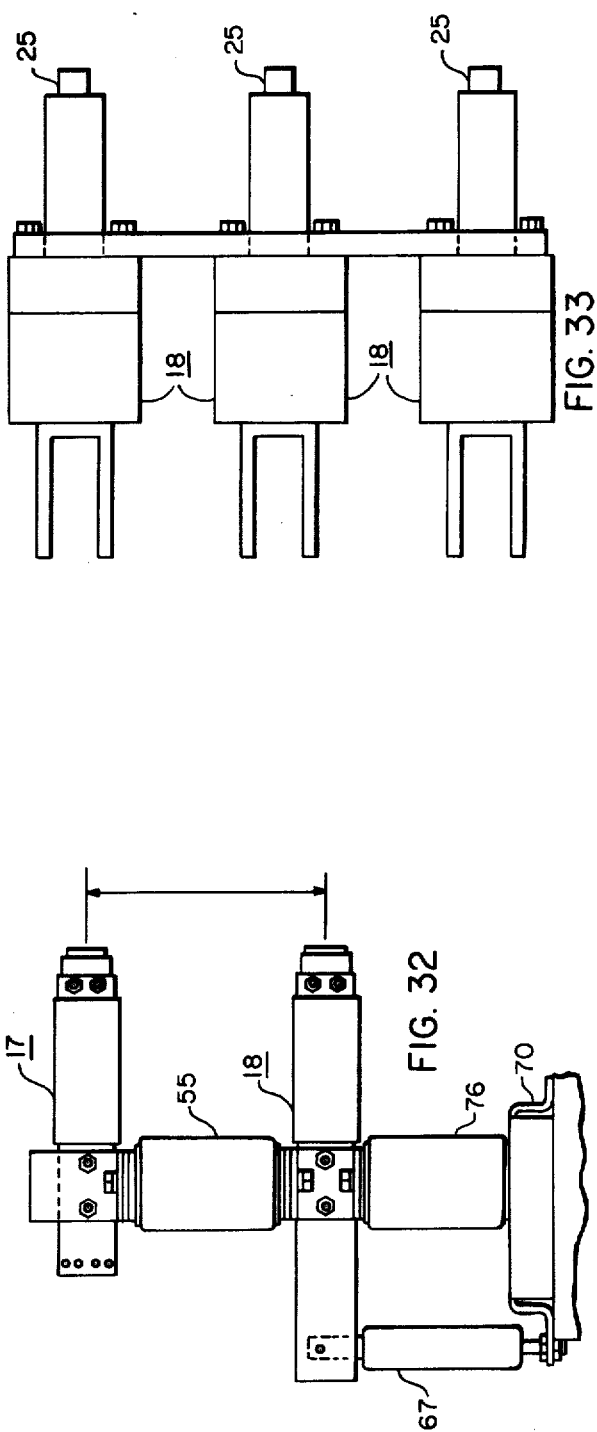

CIRCUIT-INTERRUPTERS USING SPACED-APART BARS FOR CONDUCTOR-ASSEMBLIES

This is a continuation of application Ser. No. 308,370, filed Nov. 21, 1972, now abandoned.

CROSS-REFERENCE TO RELATED APPLICATIONS

Reference is made to two divisional patent applications, which stem from the instant patent application namely United States patent application filed Jan. 16, 1974, Ser. No. 433,964 now issued as U.S. Pat. No. 3,925,599, and also United States patent application filed Feb. 4, 1974, Ser. No. 439,169 now issued as Patent No. 3,967,163. These two applications cover in detail the hardware material supporting the bus bar plates and also the broad concept of pairs of supporting insulator supports.

An additional patent application of interest using a pair of vertically, closely-shaped, rectangularly-shaped horizontally-arranged, flat, power bus-bar elements is patent application filed May 3, 1974, Ser. No. 466,746 by Charles M. Cleaveland, now U.S. Pat. No. 3,958,093 issued May 18, 1976 and assigned to the same assignee as the present application.

BACKGROUND OF THE INVENTION

Air-break circuit interrupters of the prior art have utilized round, solid, conductor assemblies, supported in vertical spaced-apart relationship by various means, such as, for example, a unitary heavy intergrally-formed procelain support having spaced horizontal mounting apertures provided therein, to accommodate the round horizontally-arranged solid conductor assemblies. The conductors are held in place within the porcelain by babbit. As well known by those skilled in the art, the stationary contact assembly and the hinge-support for the usual rotatable moving contact-arm assembly have been provided at the interior, or front ends of the round, solid, conductor assemblies, whereas the movable primary disconnecting contacts have been provided at the outer, or rear ends of the same solid, round conductor assemblies. Reference may be had to United States patent application filed Oct. 17, 1972, Ser. No. 298,689, by Charles M. Cleaveland and assigned to the assignee of the instant application, for a description of such a type of truck-mounted circuit-interrupter utilizing such a unitary heavy procelain supporting member for the conductor assemblies.

As well known by those skilled in the art, airbreak circuit-interrupters are available in a wide variety of voltage and current ratings. For example, such equipment may be suitable for 15 K.V. voltage, at a current rating of, for example, 1200 amperes, 2000 amperes and 3000 amperes. The particular voltage and current rating supplied, of course, depends upon the requirements of the utility customer, and his particular application of the equipment.

SUMMARY OF THE INVENTION

In accordance with the present invention, there is provided conductor-assemblies, or bus-bar assemblies of novel construction and configuration, comprising at least a pair of rectangular metallic bars. The bars, for example, may be of aluminum, or copper depending upon the current requirements of the equipment. Additionally, the use of a heavy unitary porcelain support, as in the aforesaid patent application Ser. No. 298,689 has been eliminated, where desired, and one or more standoff insultors, such as, for example, those formed of high-strength procelain, are employed in substitution, having mounting bolts cast therein, or otherwise secured thereto, to serve as supporting means for not only spacing the upper and lower conductor-assemblies vertically apart, but, additionally, spacing the lower conductor assembly vertically upwardly away from the lower metallic base support usually supplied for the pole-unit.

Depending upon the current requirements, the number, width, and metal of the bus-bar elements, which go to make up the upper and lower power conductor-assemblies, depends upon the current rating required of the device.

Additionally, the same standoff support may be utilized, regardless of the current-rating capacity, inasmuch as their length is solely dependent upon the voltage rating of the device. Standardization, and volume production is thereby made possible even with the different current ratings.

The rotatable moving contact support is preferably of reduced lateral width, which is desirable, by a novel configuration of the conductor-blades, which make up the composite swinging rotatable movable contact-arm assembly, so as to enable the pin-support for the usually-provided movable operating-rod and the operating-rod itself to be positioned between the outer conducting blades of the movable contact-arm assembly. This is achieved by cutting away, or otherwise effective removal of portions of the inner-disposed conducting blades, when a plurality of such conducting blades are required for increased current-carrying capacity of the movable contact-arm assembly.

BRIEF DESCRIPTION OF THE DRAWINGS

FIG. 13 is a fragmentary side-elevational view of the upper bus-bar conductor-assembly;

FIG. 14 is a top plan sectional view of a 3000A rating taken substantially along the line XIV—XIV of FIG. 13;

FIG. 15 is a top plan sectional view of a modified-type of upper bus-bar conductor-assembly for a 2000A current rating;

FIG. 16 is a top plan sectional view of a modified-type of upper bus-bar assembly for a 1200A current rating, the view being taken substantially along the line XVI—XVI of FIG. 13;

FIG. 17 is a top plan view of a still further modified-type of lower bus-bar conductor assembly;

FIG. 18 is a side-elevational view of the lower bus-bar conductor assembly of FIG. 17;

FIG. 19 is a top plan view of a further modified-type of lower bus-bar conductor assembly;

FIG. 20 is a still further modified-type of lower bus-bar conductor assembly;

FIG. 21 illustrates a side-elevational view of a modified-type of supporting assembly, in which the stand-off insulating supports are disposed in front of one another, as contrasted with the situation in which they were in side-by-side laterally-disposed relationship, as illustrated in FIGS. 1 and 2 of the drawings;

FIG. 22 is a fragmentary vertical sectional view taken substantially along the line XXII—XXII of FIG. 21;

FIG. 23 is an enlarged plan view of a supporting metallic spacer, assisting in mechanically connecting two stand-off insulators supports together;

FIGS. 29, 30 and 31 illustrate improved concepts of the lower bus-bar conductor-assembly of the present invention, FIG. 29 being a fragmentary front elevational view of the conductor-assembly of FIG. 30, and FIG. 31 being an end rear elevational view of the conductor-assembly of FIG. 30;

FIGS. 32 and 33 illustrate improved constructional mounting concepts involved in the present invention, with FIG. 33 being a top plan view of a three-phase pole-unit assembly; and, FIG. 34 is a side elevatonal view of a modified-type of interrupter, in which a vacuum-interrupter unit is substituted for the rotating contact arm and arc-chute assembly of FIGS. 1 and 2.

DESCRIPTION OF THE PREFERRED EMBODIMENT

Figure 1:
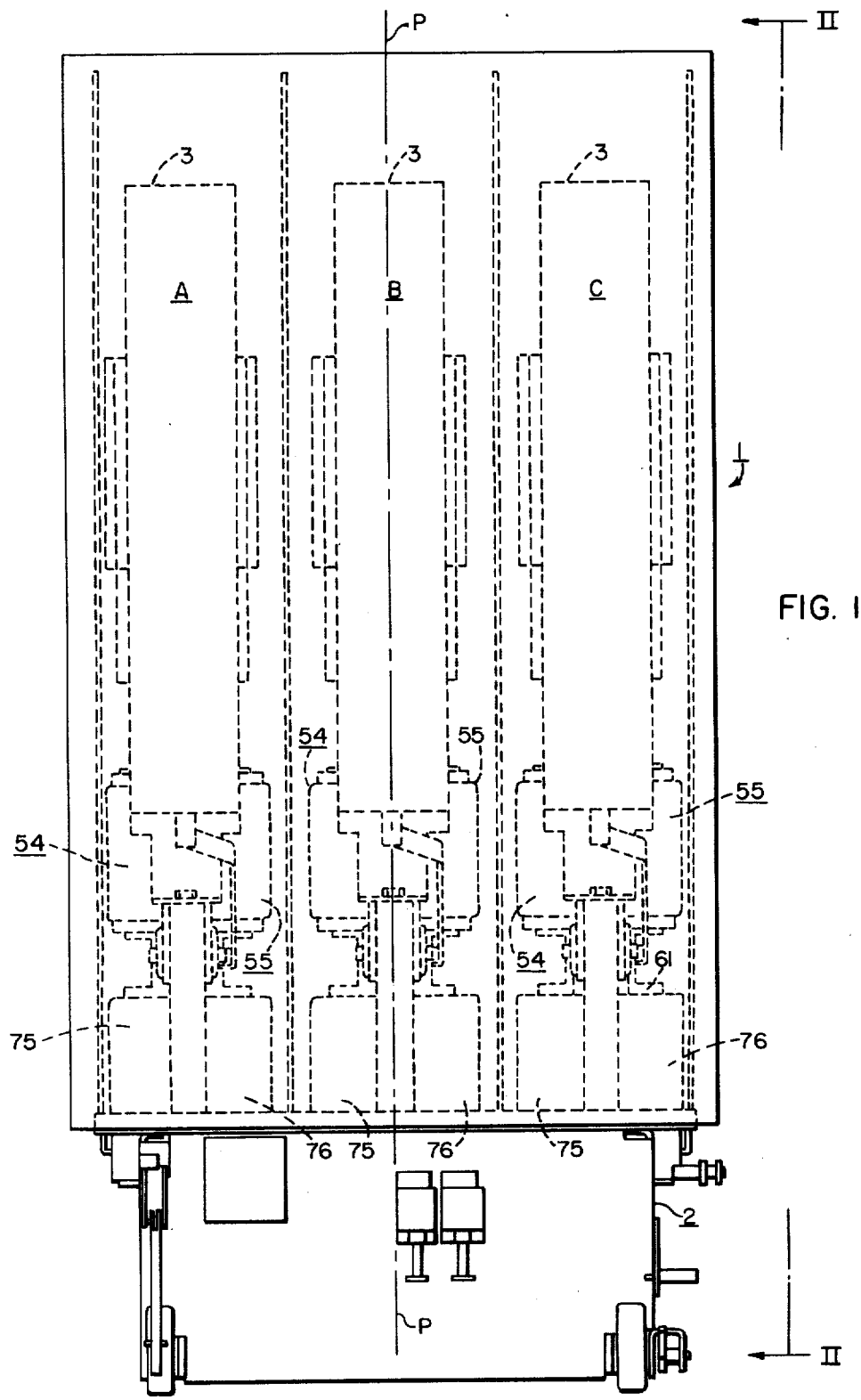
FIG. 1 is a front elevational view of a three-phase circuit-interrupter of the air-break type, adaptable for insertion into usual cubical-type switchgear.

FIG. 1 is a front elevational view of a three-phase truck-mounted circuit-interrupter assembly, generally designated by the reference numeral 1 comprising three pole-units "A," "B," and "C," which are mounted upon a lower frame support 2, and adapted for rolling into cubicle-type switchgear cell structure, as well known by those skilled in the art. Reference may be had to FIGS. 35 and 37 of U.S. Pat. No. 3,590,188, issued June 29, 1971, to Frink et al, for additional understanding regarding the application of the truck-mounted switchgear 1 of FIGS. 1 and 2, regarding its use in cubicle-type metal-clad switchgear struture.

Figure 2:
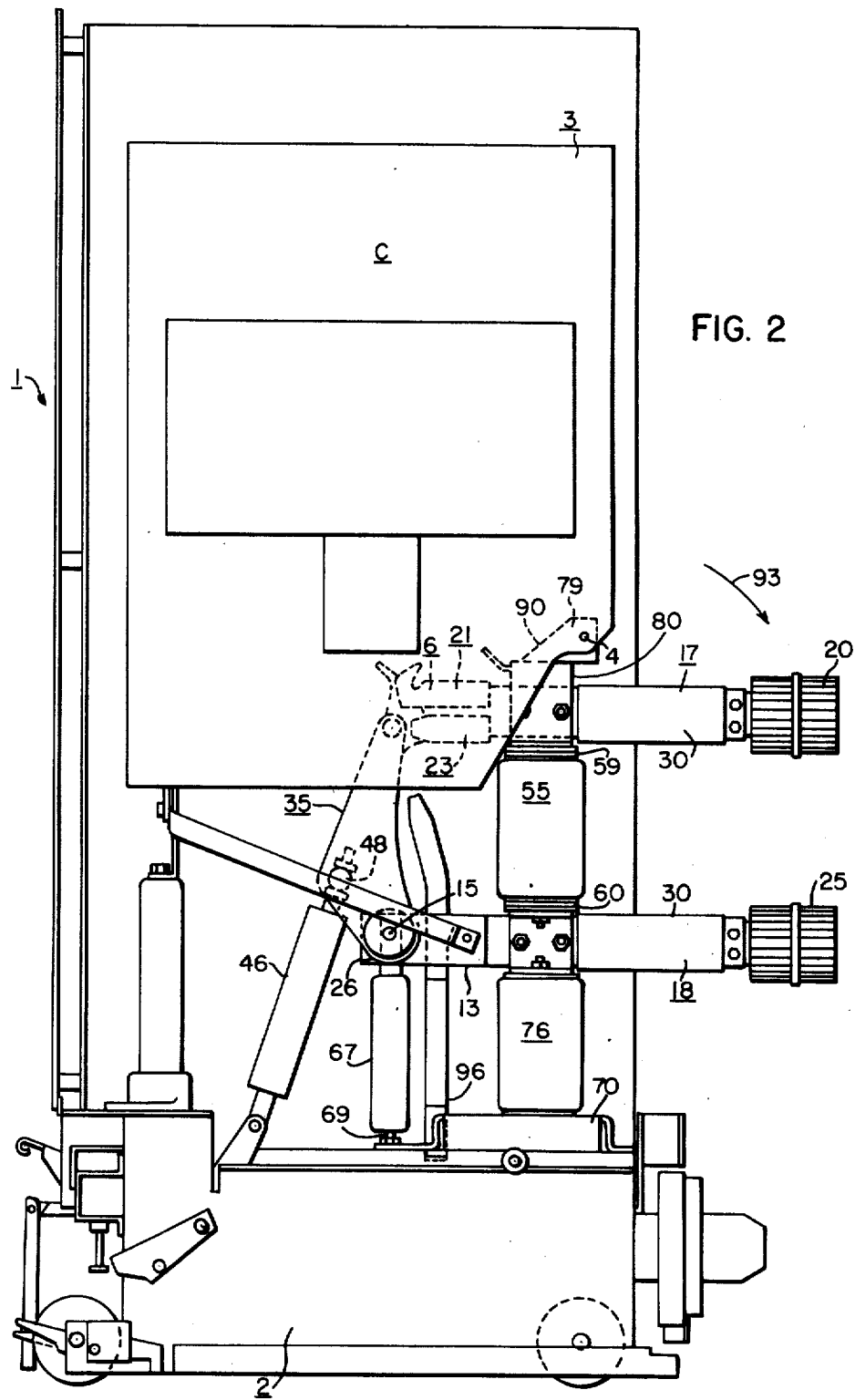
FIG. 2 is a side elevational view of the three-phase truck-mounted switchgear assembly of FIG. 1, the contact structure being illustrated in the closed-circuit position.

Referring to FIG. 2, it will be observed that each of the pole-units, A, B, and C has its own arc-chute structure 3 associated therewith. Reference may be had to U.S. Pat. No. 2,889,433 — Kozlovic et al, for a description of the arc-chute structure 3 and its functioning. Generally, such arc-chute structure 3 rotates about a pivot-pin 4 supported toward the rear of the pole-unit C, so that the entire arc-chute structure 3 may be rotated in a clockwise direction about the pin-support 4 to thereby enable a visual inspection of the separable contact structure, generally designated by the reference numeral 6.

It will be noted that unlike prior-art constructions, which have heretofore utilized round, solid, conductor-assemblies, in the improved circuit-interrupting structure 1 of my invention, I have uitlized one or more rectangular metallic bars, such as indicated by the reference numerals 7-9 of FIG. 14. Thus, to adapt the equipment to various current ratings, such as, for example, 1200 amperes, 2000 amperes, and 3000 amperes, the material, of which the rectangular bars 7-9 are formed, may be varied, that is to say utilizing different conductivity materials, such as aluminum for the lower current-ratings, such as shown in FIG. 16, and copper for the higher current ratings, such as shown in FIG. 14. This material conductivity variation is clearly illustrated in FIGS. 13-16, FIG. 14 illustrating the 3000-ampere construction, FIG. 15 illustrating the 2000-ampere construction, and FIG. 16 illustrating the 1200-ampere rating.

In more detail, it will be observed that there is provided an upper bus-bar power conductor-assembly, generally designated by the reference numeral 17, and a lower power conductor bus-bar assembly, generally designated by the reference numeral 18, as more clearly illustrated in FIG. 2 of the drawings. Generally, the upper conducting bus-bar assembly 17 has affixed thereto adjacent its rear end a movable primary disconnecting contact structure, generally designated by the reference numeral 20, and adjacent its front end a stationary arcing contact structure 21, and stationary main contact finger structures 22 and 23, as more clearly shown in FIG. 7 of the drawings.

Generally, the lower bus-bar conductor-assembly 18 comprises primary disconnecting contact structure 25, situated at its rear end, and means providing a hinge-support 26 disposed adjacent its front end, as illustrated more clearly in FIGS. 17-20 of the drawings.

In all cases, it will be noted that, generally, the construction of the upper and lower power bus-bar conductor-assemblies comprises spaced bus-bar plates, which are spaced apart by spacers 28-30 as shown. In addition, each of the bus-bar plates is wrapped with an insulating layer 30 for electrical reasons, where the bus-bar conductor assemblies 17, 18 extend in a somewhat exposed relationship rearwardly of the arc-chute structure 1, as illustrated more clearly in FIG. 2 of the drawings.

Figure 3:
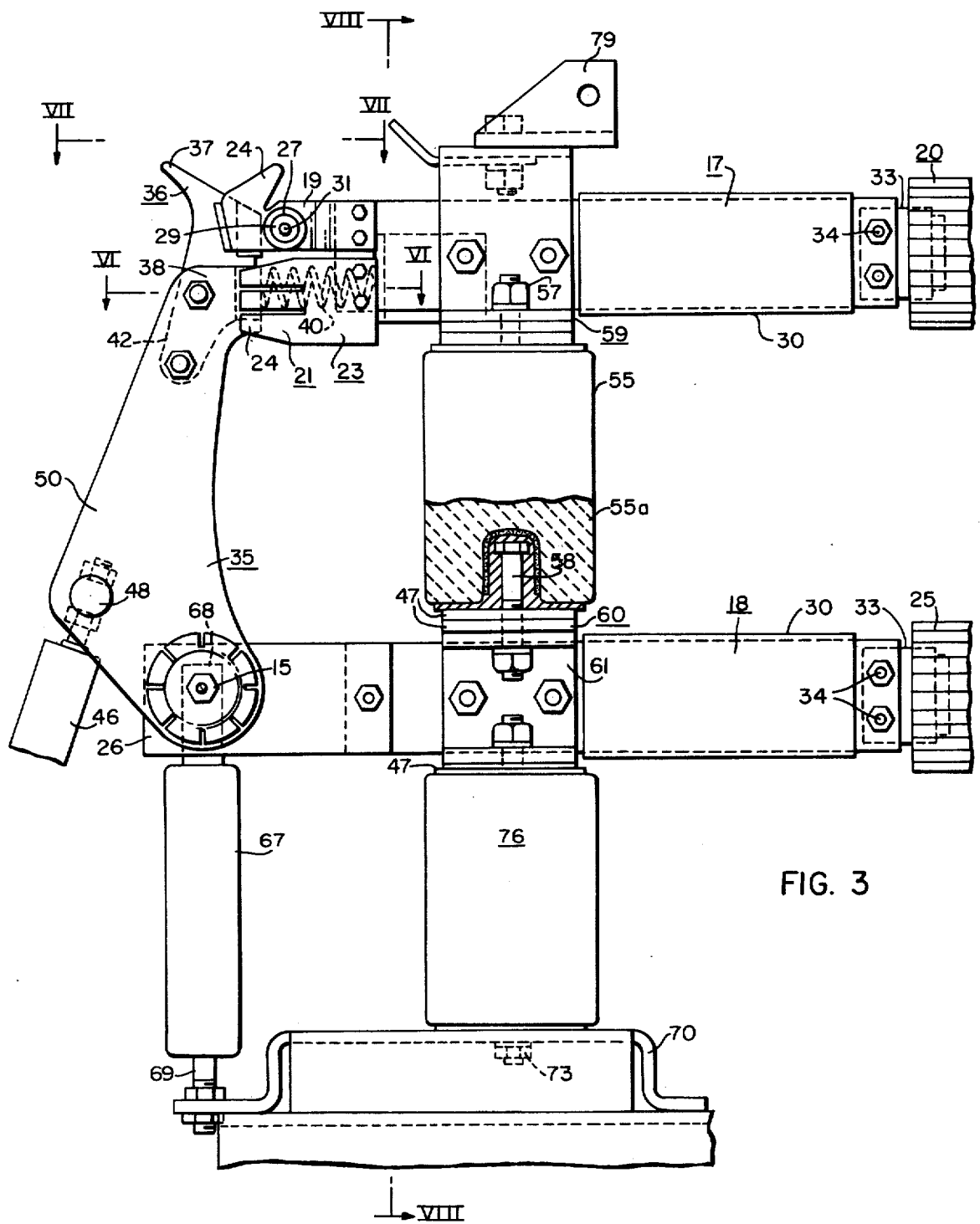
FIG. 3 is an enlarged side-elevational view, partially in vertical section, of one of the pole-units of the three-phase switchgear assembly of FIGS. 1 and 2, illustrating the contacts in the closed-circuit position.

With reference to FIG. 3, it will be observed that the moving contact-arm assembly, generally designated by the reference numeral 35, comprises one or more vertically-extending spaced conducting plate portions, more clearly illustrated in FIGS. 4, 5, 6, 9 and 10 of the drawings, which will be described more fully hereinafter.

The lower-bus-bar power conductor-assembly 18 comprises, as was the case with the upper bus-bar power conductor assembly 17, a plurality of spaced plate-portions 11, 12 and 13. With reference to FIG. 17, for example, it will be noted that the outermost conducting plates 11 and 13 have pivot apertures 14 provided adjacent their front ends, to accommodate a pivot pin 15, more clearly illustrated in FIG. 21 of the drawings. As well known by those skilled in the art, the pivot pin 15 accommodates opening and closing swinging rotative movement of the movable contact-arm assembly 35.

Figure 5:
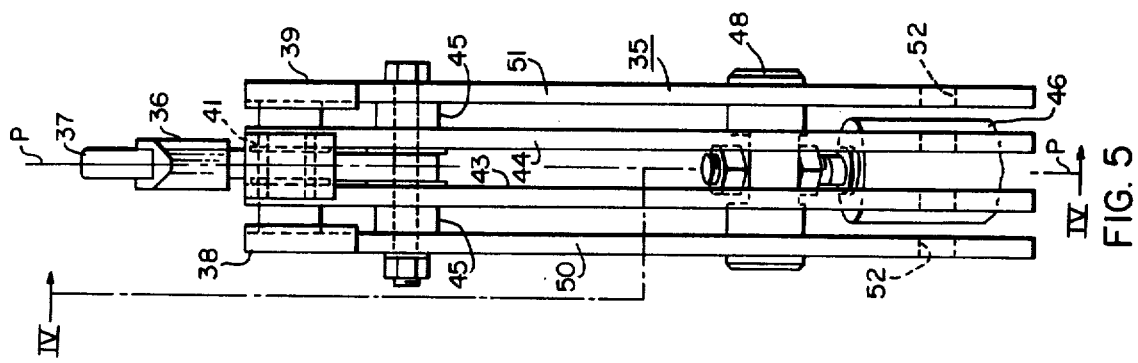
FIG. 5 is a rear elevational view of the rotatable moving contact-arm assembly of FIG. 4.
Figure 4:
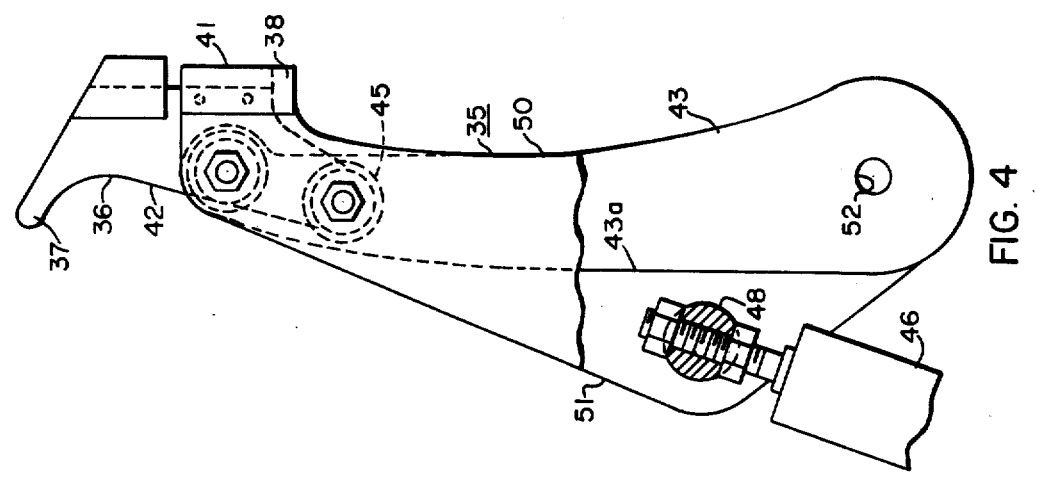
FIG. 4 illustrates the component parts of the rotatable moving contact-arm assembly of FIG. 3, and represents a sectional view taken along the line IV—IV of FIG. 5.
Figure 10:
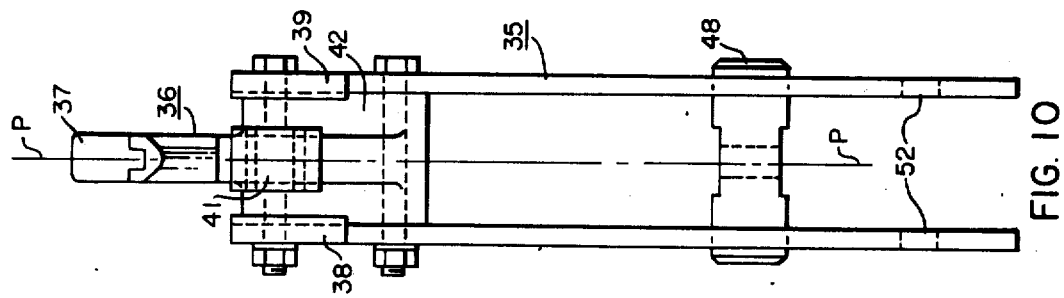
FIG. 10 is a rear elevational view of the rotatable movable contact-arm assembly of FIG. 9, taken substantially along the line X—X of FIG. 9, looking in the direction of the arrows.
Figure 9:
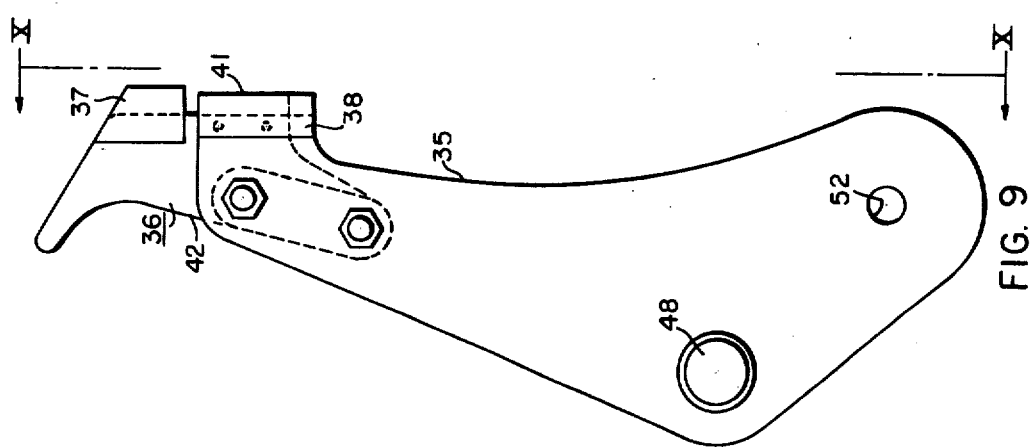
FIG. 9 is a side-elevational view of a component part of a moving contact-arm assembly of reduced current rating.

As was the case with the stationary contact structure, the outer free end of the rotatable moving contact-arm assembly 35 includes a centrally-located arcing contact 37, and two lateral adjacently-disposed main contacts 38 and 39, as more clearly illustrated in FIGS. 4 and 5 of the drawings.

In the case of the higer-current ratings, one or more additional intervening plate portions, such as the plates 43 and 44, may be utilized, being spaced by spacers 45 from the outer main pivotal plates 50, 51, which have apertures 52 provided through their lower ends to accommodate the pivot pin 15.

As will be obvious from an inspection of FIG. 3 of the drawings, it will be observed that the rectangular metallic bars 7-9 may be wrapped with insulation 30, the upper power conductor-assembly 17 supporting the primary disconnecting contact 20 at the rear end thereof. At the front end of the upper power conductor assembly 17 is fixedly secured the relatively stationary contact structure, generally designated by the reference numeral 19, and shown more clearly in FIGS. 3, 6 and 13 of the drawings.

In a somewhat similar manner, the lower power conductor-bus-bar assembly 18 supports the primary disconnecting contact assembly 25 at its rear end, and also provides a hinge-support 26 for the rotatable moving contact-arm assembly 35 at its front end. Supporting the upper or first, and the lower or second power conductor assemblies 17, 18 in vertical spaced-apart relationship is insulating post means, in this particular instance comprising a pair of laterally-disposed insulator-supports 54, 55 of the standoff-insulator variety. Each of said insulator-supports 54, 55, as is illustrated in the sectional view of FIG. 3, comprises a pair of metallic mounting bolts 57, 58 cast into the insulator body 55a, so as to enable the bolts 57, 58 to fixedly secure the component hardware parts 59, 60 of the support-assemblies in the desired manner.

Figure 8:
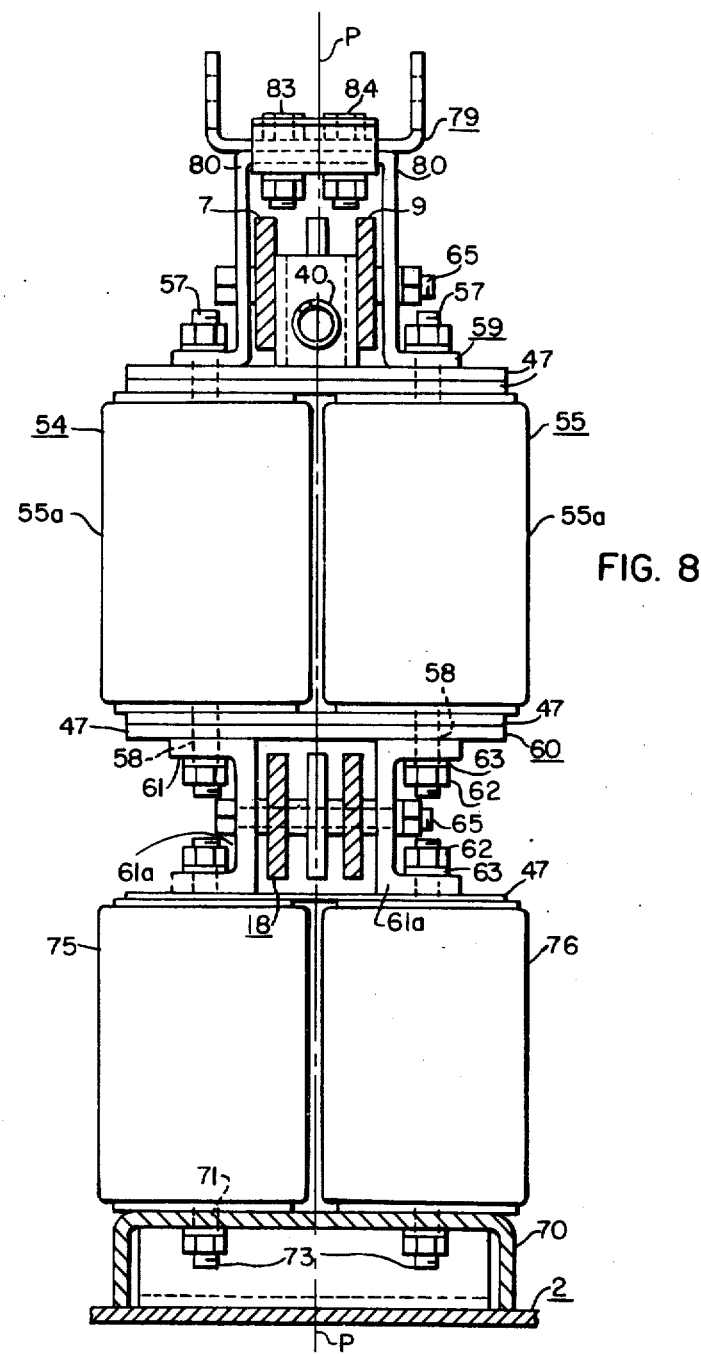
FIG. 8 is a fragmentary sectional elevational view, taken substantially along the line VIII—VIII of FIG. 3, looking in the direction of the arrows.
Figure 24:
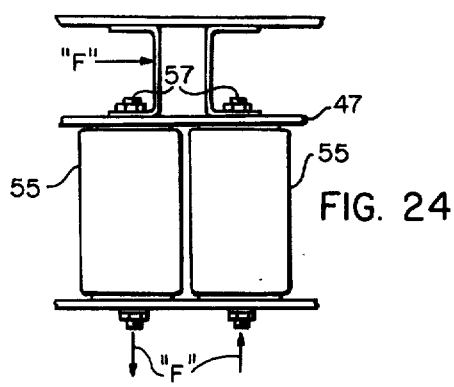
FIG. 24 illustrates the bending forces and reactions encountered during high current in a pair of stand-off insulators, where the two are disposed laterally in side-by-side relationship, as illustrated in FIGS. 1 and 2 of the drawings.

Channel-support members 61, as more clearly illustrated in FIG. 8 of the drawings, are located outwardly of the conductor assembly 18, and accommodate the ends of the mounting bolts 58 of the insulator supports 54, 55, nuts 62 being utilized, to provide a firm fixed assembly of the parts. In addition, the rectangular metallic conducting bars, comprising the upper and lower power conductor-assemblies 17, 18 are fixedly secured by laterally-extending mounting bolts 65, extending laterally through the web portions 61a of the channel members 61. Again, FIG. 8 illustrates this construction more clearly.

A lower metalic support base 70 is provided having apertures 71 therethrough to thereby accommodate the lower ends of the mounting bolts 73, extending through the lower set of porcelain standoff supports 75, 76, as likewise illustrated more clearly in FIG. 8. The several lower base-supports 70 of the three pole-units A, B and C may be secured to the lower grounded supporting structure 2 in any suitable manner, as by mounting bolts 73, reference being had additionally to FIG. 2 in this connection.

As well known by those skilled in the art, the rotatable movable contact-arm assembly 35 is provided to effect the bridging closed engagement between the relatively stationary contact structure 19 and the movable contact structure, 36 supported at the outer free end of the rotatable moving contact-support assembly 35.

Figure 6:
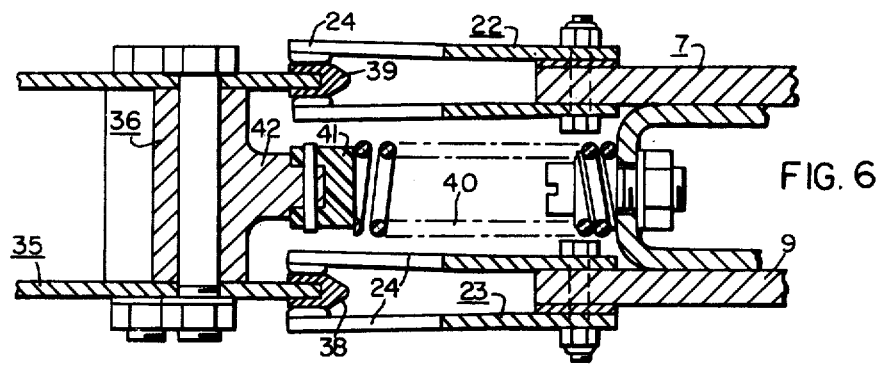
FIG. 6 is an enlarged top plan sectional view taken substantially along the line VI—VI of FIG. 3 looking in the direction of the arrows.
Figure 11:
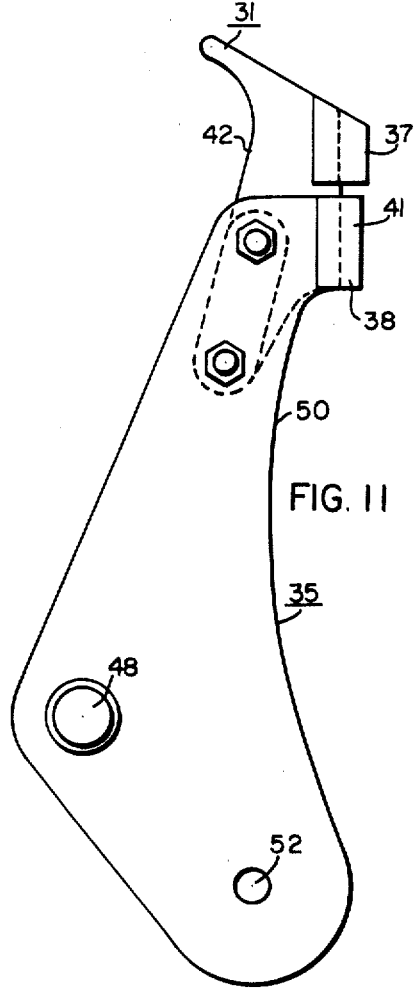
FIG. 11 is a side-elevational view of the moving contact-arm assembly.
Figure 12:
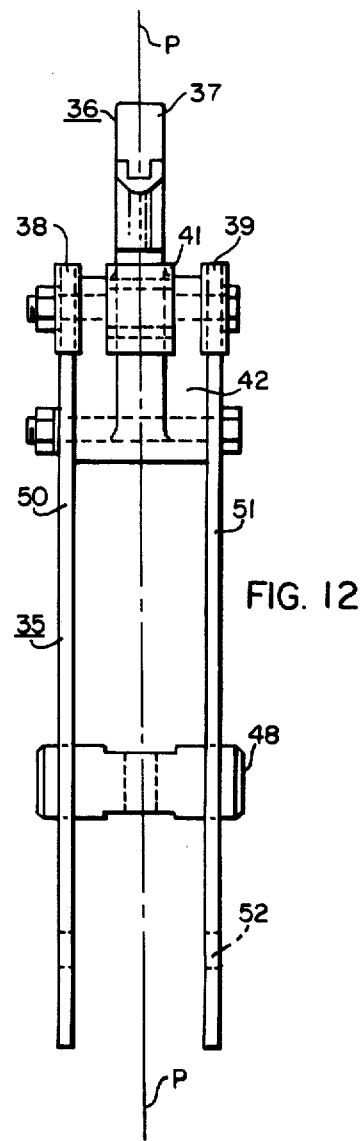
FIG. 12 is a rear elevational view of the movable contact-arm assembly of FIG. 11, taken substantially along the line XII—XII of FIG. 11.
Figure 7:
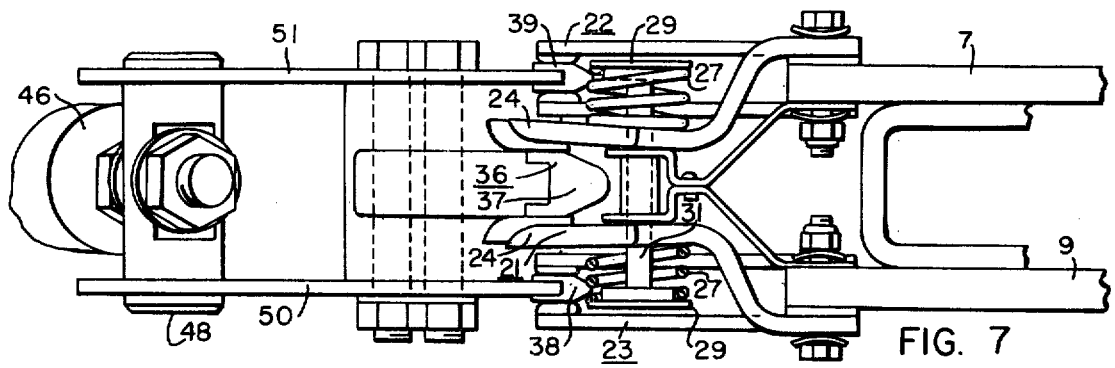
FIG. 7 is a top plan view taken substantially along the line VII—VII of FIG. 3, looking in the direction of the arrows.

With reference to FIGS. 3 and 7 of the drawings, it will be noted that the rotatable movable contact-arm assembly comprises a pair of outer conductor blade plates 50, 51, having main moving contacts 38, 39 disposed at their outer free ends, which make closing contacting engagement with spaced pairs of main stationary finger contacts 22, 23 supported at the inner ends of the outer-disposed bus-bar elements 7, 9, as shown in FIG. 7. The main stationary finger contacts 22, 23 are resiliently biased inwardly by the inherent flexibility of the contact fingers so as to make good contacting engagement with the two main movable contacts 38, 39 in the closed-circuit position, as shown in FIGS. 6 and 7.

In addition to the spaced outer main moving contacts 38, 39, there is provided a centrally-disposed arcing contact, designated by the reference numeral 37, which engages a pair of stationary arcing finger contacts 24, as illustrated more clearly in FIG. 7 of the drawings. The stationary finger contacts 24 are biased inwardly by a pair of aligned contact compression springs 27, disposed between the outer sides of the stationary finger contacts 24 and cap portions 29 provided on a through mounting bolt 31. Thus, the stationary arcing finger contacts 24 are biased into good contacting engagement with the main movable arcing contact 37 in the closed-circuit position of the device, as illustrated in FIGS. 3 and 7 of the drawings.

It will be observed that there is provided an accelerating spring 40, as more clearly shown in FIG. 6, which engages a moving insulating plug 41 pinned to a moving cross-member 42, provided adjacent the outer free end of the rotatable movable contact-arm assembly 35. Thus, the accelerating compression spring 40 assists in opening the movable contacts 38, 39.

FIGS. 4 and 5 illustrate a relatively high-current rating of the movable contact-arm assembly 35, whereas FIGS. 9–12 illustrate a lower current rating. It will be noted that on the lower-current ratings, there are only provided the two outer conducting blades 50, 51, which are adequate for the lower-current ratings. However, in the case of higher-current ratings, the addition of the intervening conducting plates 43, 44, more clearly shown in FIG. 4, are additionally provided for the extra current-carrying capability required.

Again, FIGS. 4 and 5 show more clearly the pivot pin 48 pivotaly connecting the movable operating rod 46, it being noted that a segmental portion 43a, 44a of the two intervening plates 43, 44 is eliminated to provide clearance for the rotating movement of the upper end of the movable operating rod 46 in its opening and closing movements. This enables a close spacing to be provided between the outer plates 50, 51, and, consequently, the same arc chute 3 may be employed, as has been supplied in the prior-art pole-units having a lower current rating.

To provide additional rigidity for the hinge support 26, an insulating hinge-support rod 67 is provided, as more clearly illustrated in FIGS. 2 and 3 of the drawings. It will be observed that again, preferably, the hinge-support rod 67 is of insulating material having stud-portions 68, 69 cemented into the upper and lower-end cavities thereof, in a manner similar to that utilized by the bolts 57, 58 cemented in the cavities provided in the stand-off insulators 55, as more clearly illustrated in FIG. 3 of the drawings. The lower adjustable stud 69 of the hinge-support 67 may be secured by any suitable means to the lower base support 70, as shown more clearly in FIGS. 2 and 3. The upper adjustable end-stud portion 68 may have an aperture therethrough, through which the pivot pin 15 may pass, the construction being more clearly shown in FIG. 3 of the drawings. Thus, there is provided additional adjustable support for the hinge-support structure 26 for the rotatable movable contact-arm assembly 35.

The concept of using the adjustable support rod 67 (FIG. 2) and 67A (FIG. 34) is set forth and claimed in Richard Burgoon patent application filed Mar. 22, 1973, Ser. No. 344,014, now U.S. Pat. No. 3,973,096, issued Aug. 3, 1976, and assigned to the assignee of the instant patent application.

As shown more clearly in FIGS. 13 and 14 of the drawings, it will be observed that the movable primary disconnecting contacts 20, 25 cooperate with a solid coupling plug member 33, which may be so machined that by the addition of a bolt 34, proper spacing and support is provided for the ends of the bus-bar elements 11, 12, 13, and the elements 7, 8, 9 associated with the upper power conductor-assembly 17. FIGS. 14 and 17 may be referred to in this connection.

Figure 34:
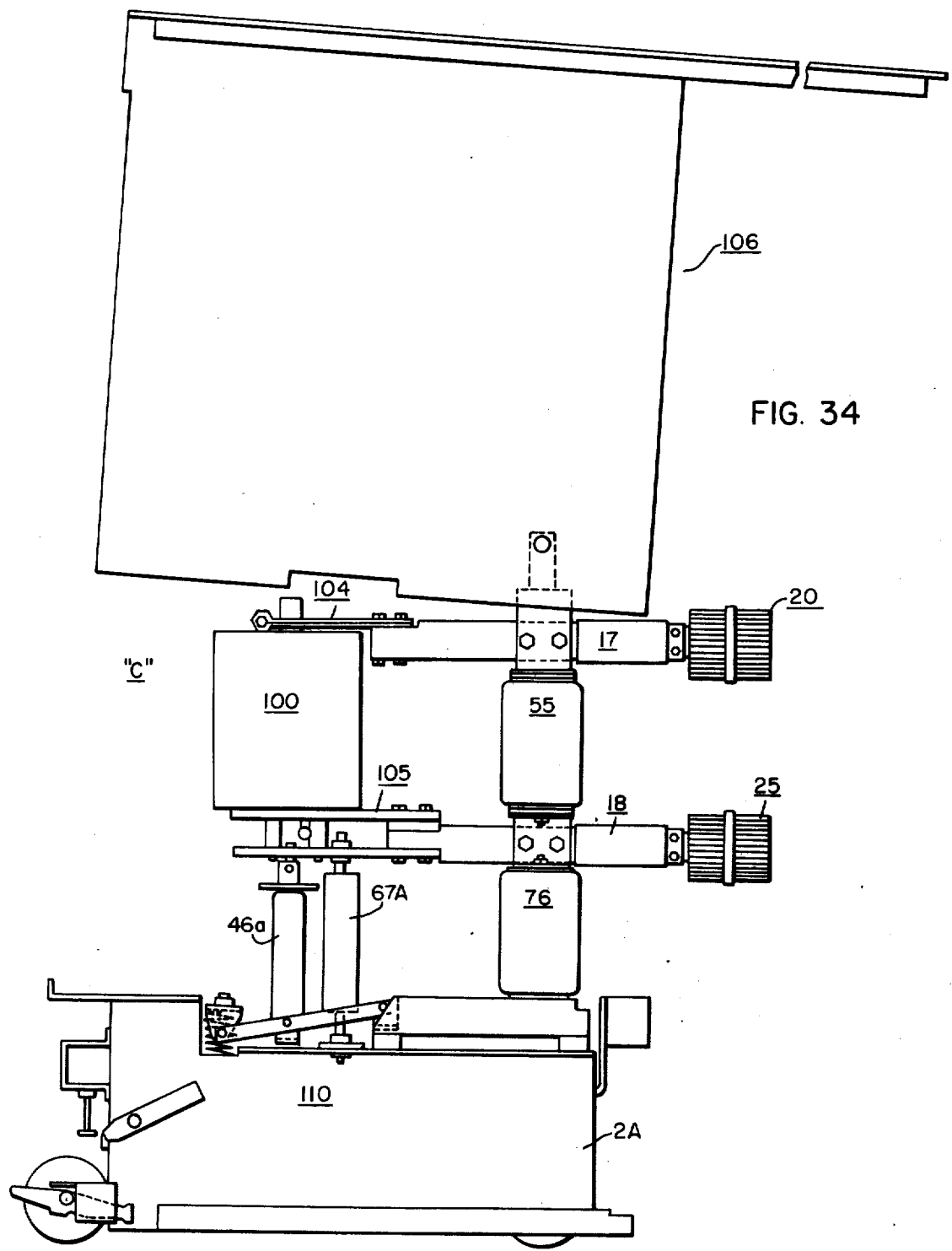

With reference to FIGS. 3 and 13 of the drawings, it will be observed that a hinge-support structure 79 is provided for pivotal swinging movement of the upper arcchute structure, as more clearly illustrated in FIG. 34 of the drawings. Generally, the arc chute support structure 79 comprises a pair of "Z" metallic elements 80, which are secured by the bolts 57 (FIG. 8), and have their upper ends come in close engagement, as at 81. Bolts 83 and 84 cooperate with the upper flange portions 80a of the Z elements 80, and additionally secure a channel hinge-element 90, having the pivot aperture 4 therethrough to accommodate a pivot pin, thus enabling rotative movement of the arc-chute structure 3, as indicated by the arrow 93 of FIG. 2 of the drawings.

As well known by those skilled in the art, to assist in interrupting low-value currents, where the magnetic effect provided in the arc-chute structure 3 is weak, a blast of air is provided through a puffer tube 96, more clearly illustrated in FIG. 2 of the drawings. The functioning and theory regarding the blast-tube is set forth in U.S. Pat. No. 2,734,971 — Lingal et al, should it be of interest.

The present invention is not exclusively concerned with an arc-chute structure, such as the one designated by the reference numeral 3 in FIG. 2 of the drawings, and described in the aforesaid U.S. Pat. No. 2,889,433, but the present invention has applicability, where desired, to vacuum-interrupter elements, such as set forth in U.S. Pat. application filed Nov. 15, 1972, Ser. No. 306,669 by Charles M. Cleaveland, and assigned to the assignee of the instant application.

With reference to FIG. 34 of the drawings, it will be observed that a vacuum-interrupter element 100 has been substituted for the arc-chute 3 and rotating contact arm structure 35 as illustrated in FIG. 2. It will be observed that again the upper and lower power conductor bus-bar assemblies 17 and 18 may be employed, having supporting structure 104, 105 secured adjacent the inner ends of the power conductor bus-bar assemblies 17, 18 to fixedly secure the vacuum-interrupter element 100 in the proper location. An operating-rod structure 46a may interconnect the operating mechanism 110 with a movable contact structure, which reciprocally operates within the interrupter element 100 interiorly thereof. Thus, the present invention may be utilizied with various types of interrupting assemblies, where desired.

Although FIGS. 1 and 2 illustrate the stand-off insulators 54, 55 in lateral side-by-side arrangement, as illustrated in FIG. 8, nevertheless, where desired, the stand-off insulator assemblies 54, 55, 75, 76 may be arranged in front of each other, as more clearly shown in FIGS. 21 and 22 of the drawings. With reference to FIGS. 21 and 22, it will be observed that stand-off insulators 115, 116, 117 and 118 are disposed in front of each other, as viewed when looking into the arc-chute structure, as, for example, looking into the drawing of FIG. 1. This provides additional support, where desired.

Figure 25:
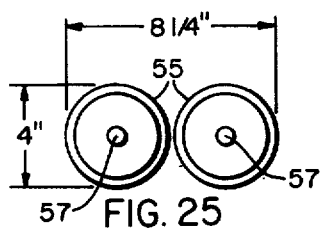
FIGS. 25 and 26 are diagrammatic views illustrating the saving in space (in one direction) with again of twice the cantilever bending strength, as a result of using two stand-off insulator supports, instead of one large conventional stand-off insulator support.
Figure 26:
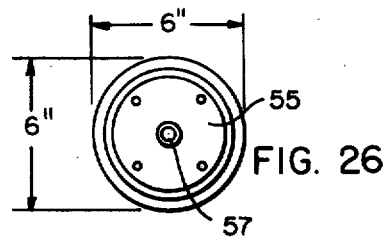

The new stand-off insulator concept is technically possible now by preferably using insulators 54, 55, 75, 76 in pairs. These pairs of insulators are stronger than one large single insulator with the same section area. If the force is applied to the insulator pair so as to cause bending or cantilever loading, one insulator will be in tension and the other in compression. Porcelain is very strong in compression and moderately strong in tension and because the insulators are separate, the applied cantilever force to break the procelain is higher since there is no shear stress between the pairs where there would be with the two procelains connected together. The strength in bending of each single insulator by itself is about 17,900 in lbs. but when tied together in pairs with metallic end plates the strength is more than doubled and is about 40,920 in/lbs. as shown in FIGS. 25 and 26. This helps to attain the required strength to handle the high momentary currents, phase-to-phase. In lower short circuit current applications the force from the mechanism that operates the breaker 1 may be the highest force and then it may be desirable to orient the pair of insulators to withstand the force in that direction.

Porcelain insulators were not used in the past because there was not physical room for one single insulator that would be large enough to withstand the forces and no one thought of using two smaller insulators in pairs that have a higher area moment in the direction needed. The pair of insulators with single bolt fastening on the ends is less expensive than the A-30 type. $9. a pair versus $14. for one A-30. In addition, it takes more than one A-30 to be of equal strength. Because the single bolt termination on the end of the stand-off requires a comparatively small hole in the porcelain for babbit, it has more wall thickness than the A-30 type and consequently more strength.

Figure 27:
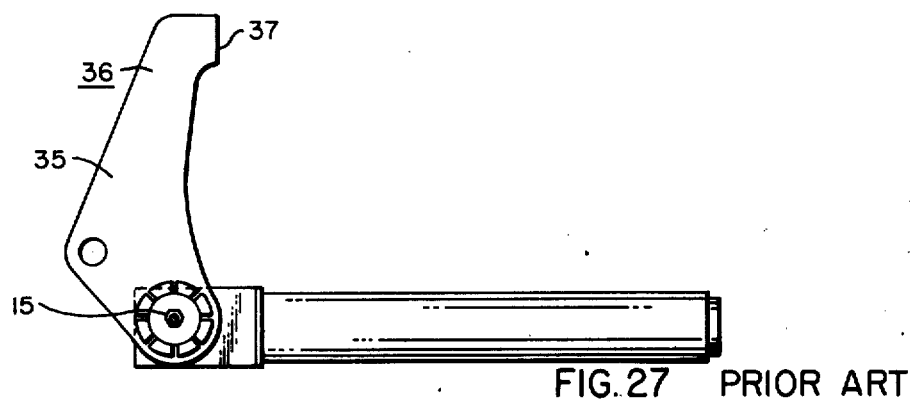
FIGS. 27 and 28 illustrates a comparison between conductor assemblies utilizing a round solid conductor stud, as opposed to the spaced bus-bar conductor-assembly, as set forth in the instant invention.
Figure 28:
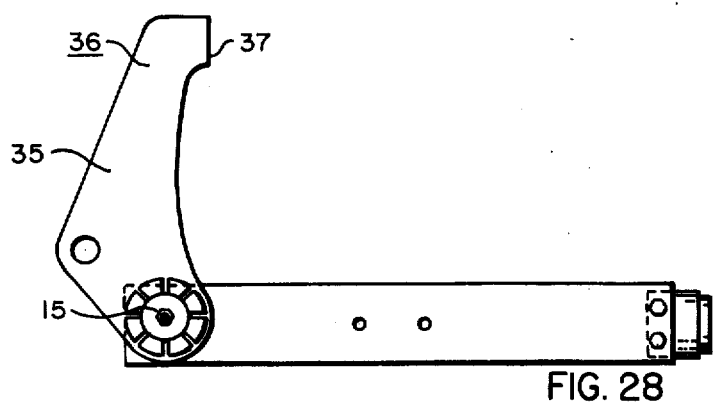

The construction disclosed has a versatile conductor arrangement and several advantages. Since the conductors are flat bars, the breaker blades can pivot directly on the bars as shown in FIG. 28 without the conventional transition from customary round conductors to a casting or extrusion with flat surfaces as shown in FIG. 27. The flat bars are put in multiples and air can pass through them for better cooling and by adding the correct number of bars, the current rating can be picked or changed in the field.

With reference to FIGS. 1 and 8, it will be noted that the wide dimension W (FIGS. 13 and 18) of the power bus-bar elements 7, 9 is parallel, or coincident to an imaginary vertical plane P—P taken through the vertical dimension of the circuit-interrupter 1. FIG. 1 shows the imaginary plane P—P taken through the centerpole B of the three-phase circuit-interrupter 1 of FIG. 1 of the drawings.

It will furthermore be noted that the power-conductor assemblies 17, 18 have the wide dimension W in planes, which are either parallel to, or coincident with said imaginary plane P—P taken through the circuit-breaker 1. This leads advantageously to reduced space requirement for the circuit-interrupter and also to a desirable vertical ventilation of the hot air passing between the spaces provided between the laterally-spaced power conductor bus-bar elements 7, 9, with particular reference being directed to FIG. 8 of the drawings.

In addition, the moving contact assembly, which is pivotally mounted at 52 on the lower power-conductor assembly preferably comprises a pair of laterally-spaced plates 50, 51, which, additionally, are also in planes parallel to, or coincidental with said imaginary vertical plane P—P.

Also the construction disclosed is "open" and the conductors and conductor support pieces can cool by convection to the air. The old pole unit and those of our competitors are "closed" and the conductors are covered with procelain or deep within cast epoxy or polyester.

Since there is no brazing, the conductors can be aluminum most of their length and can be copper (by bolting) only where there are sliding contacts at each end. In detail: All copper to aluminum joints are silver plated and bolted. This construction is new to breakers, especially the copper shim at the hinge joint upon which the blades can rotate. It is not acceptable to rotate on aluminum.

Upper bar conductors use shims, but only as spacers when bar thickness changes with different current ratings. The spacers keep the contact finger spacing constant and makes fingers and blade contacts standard for different current ratings. Past practice says not to use spacers because they add contact resistance. New construction is able to get by without a polyester bar tieing all three phases together as all breakers do now.

The new construction using stand-off insulators has another feature that may account for its outstanding performance under high momentary current force: Since the insulators are coupled together by metallic pieces that are somewhat flexible, the shock transmitted to the porcelain is less than with our old design with one huge piece of porcelain and conductors within.

From the foregoing description, it will be apparent that there has been provided an improved air-break circuit-interrupting construction 1, in which considerable duplication of parts for various current ratings is possible, because of the use of insulating post means, such as, for example, the pairs of standoff insulators 54, 55, 76, which are the same regardless of the current rating of the device. Since the length of the standoff insulators 54, 55, 76 is wholly dependent upon the voltage rating of the device, volume production is thereby made possible, with only differences in the number and material of the bus-bar plates 7, 8, 9, 11, 12, 13 provided for the upper and lower conductor assemblies 17, 18, as set forth hereinabove.

In addition, the rotatable moving contact-arm assembly 35 is likewise adaptable for various current ratings, and again comprises a number of rectangular plate-like elements 50, 51, which may have intervening additional conductor blades 43, 44 for the higher current ratings.

Although there has been illustrated and described specific structures, it is to be clearly understood that the same were merely for the purpose of illustration, and that changes and modifications may readily be made therein by those skilled in the art, without departing from the spirit and scope of the invention.

I claim as my invention:

1. The combination in a circuit-breaker structure of a first stationary power-conductor assembly, stationary contact means fixedly secured adjacent one end of said first stationary power-conductor assembly, means defining a second stationary power-conductor assembly, insulating post means spacing said first and second stationary power-conductor assemblies apart and in generally parallel arrangement, movable bridging contact means pivotally supported adjacent one end of said second stationary power-conductor assembly, each of said first and second stationary power-conductor assemblies comprising two or more laterally spaced stationary rectangular power bus-bar elements commonly stationarily mounted relevant to one another, at least two of the two or more laterally-spaced stationary rectangular power bus-bar elements of each power-conductor assembly extending substantially the entire axial length of its respective stationary power-conductor assembly, and means for pivotally rotating said movable bridging contact means into contacting engagement with said stationary contact means for effecting closure of the electrical circuit through the circuit-interrupter.

2. The combination according to claim 1, wherein the rotatable movable bridging contact means comprises at least a pair of laterally-spaced conducting rectangularly-shaped plates.

3. The combination according to claim 1, wherein means defines a grounded frame structure, and a second insulating post means spaces the second stationary power-conductor assembly away from said grounded frame structure.

4. The combination according to claim 1, wherein the insulating post means comprises a pair of closely-spaced, side-by-side, parallel-arranged post-insulator supports, said pair of post-insulator supports being generally parallel to one another and extending in the same general direction, said pair of side-by-side post-insulator support additionally being closely spaced next to each other and mechanically rigidly interconnected at at least one end thereof for combined strength and rigidity of support.

5. The combination according to claim 4, wherein means defines a grounded supporting frame structure, and a second pair of post-insulator supports spaces the second power-conductor assembly away from said grounded supporting frame structure, said second pair of post-insulator supports being similar in construction and disposition to the first-mentioned pair of parallel-arranged post-insulator supports.

6. In combination, a pair of spaced stationary power-conductor assemblies, insulating post means spacing said pair of spaced stationary power conductor assemblies apart in generally parallel arrangement, each of said spaced stationary power-conductor assemblies comprising two or more laterally-spaced stationary rectangular power bus-bar elements commonly stationarily mounted relevant to one another, at least two of the two or more laterally-spaced stationary rectangular power bus-bar elements of each power-conductor assembly extending substantially the entire axial length of its respective stationary power-conductor assembly, stationary contact means fixedly secured adjacent one end of said power-conductor assemblies, means defining a rotatable movable bridging contact means, means pivotally supporting said movable bridging contact means rotatably relevant to one end of the other stationary power-conductor assembly, and means for effecting opening and closing swinging motions of said pivotally-mounted rotatable bridging movable contact means into contacting engagement with the relatively-stationary contact means.

7. The combination according to claim 6, wherein the rotatably mounted movable bridging contact means comprises two or more laterally-spaced conducting plate portions.

8. A circuit-interrupter of the air-break type including, in combination, means defining an upper stationary power-conductor assembly comprising at least two laterally-spaced power bus-bar plate elements, means defining a lower-disposed stationary power-conductor assembly comprising at least two laterally-spaced stationary power bus-bar conducting elements, at least two of the laterally-spaced power bus-bar plate elements of each power conductor assembly extending substantially the entire axial length of its respective stationary power-condcutor assembly, post-insulating means spacing the upper and lower stationary power-conductor assemblies apart in spaced vertical relationship and generally parallel to one another, means defining a lower grounded frame structure, a second insulating post means fixedly spacing the lower stationary power-conductor assembly away from said lower grounded frame structure, relatively-stationary contact means fixedly secured adjacent one end of the upper stationary power-conductor assembly, means defining movable bridging contact means, means for pivotally mounting said movable bridging contact means rotatably adjacent one end of the lower-disposed stationary power-conductor assembly, and operating means for effecting swinging rotatable opening and closing motions of said movable bridging contact assembly.

9. A truck-mounted circuit-interrupting structure adaptable for movement into and out of a cooperating cell structure comprising, in combination, means defining a lower-disposed grounded movable metallic frame support, wheel-means associated with said grounded metallic movable frame support for enabling the same to be rolled into and out of a cooperating cell structure, means defining upper and lower vertically-spaced generally-parallel stationary first and second power-conductor assemblies, post-insulating means spacing said vertically-spaced first and second stationary power conductor assemblies apart in spaced generally-parallel vertical relationship, each of said first and second stationary power-conductor assemblies comprising two or more laterally-spaced stationary rectangular-shaped power bus-bar elements commonly stationarily mounted relevant to one another, a second post insulating means for spacing the lower stationary second power-conductor assembly above said lower grounded frame structure, stationary contact means fixedly secured adjacent one end of the upper stationary power-conductor assembly, movable bridging contact means, means for pivotally rotatably swinging said movable bridging contact means adjacent the end of the lower stationary power-conductor assembly, at least two of the two or more laterally spaced stationary rectangular power bus-bar elements of each power-conductor assembly extending substantially the entire axial length of its respective stationary power-conductor assembly, primary disconnecting contact means disposed adjacent the rear ends of the first and second stationary power-conductor assemblies, and operating means for effecting the rotatable opening and closing motions of said movable rotatable bridging contact means.

10. The combination according to claim 8, wherein the rotatable movably mounted bridging contact assembly comprises at least a pair of laterally-spaced conducting plate elements.

11. The combination in a circuit-breaker structure of a first stationary power-conductor assembly, stationary contact means fixedly secured adjacent one end of said first stationary power-conductor assembly, means defining a second stationary power-conductor assembly, insulating means spacing said first and second stationary power-conductor assemblies apart, movable contact means pivotally supported adjacent one end of said second stationary power-conductor assembly, each of said first and second stationary power-conductor assemblies comprising two or more laterally spaced stationary rectangularly-shaped power bus-bar elements commonly stationarily mounted relevant to one another, at least two of the laterally-spaced stationary rectangularly-shaped power bus-bar elements of each power conductor assembly extending substantially the entire axial length of its respective stationary power-conductor assembly, and means for pivotally rotating said movable bridging contact means into contacting engagement with said stationary contact means for effecting closure of the electrical circuit through the circuit-interrupter.

12. The combination in a circuit-breaker structure of power-conducting means defining a first stationary power-conductor assembly, stationary contact means fixedly secured adjacent one end of said first stationary power-conductor assembly, conducting means defining a second stationary power-conductor assembly, insulating means spacing said first and second stationary power-conductor assemblies apart in a generally parallel relationship with said first and second stationary power-conductor assemblies extending in the same general direction, movable contact means pivotally supported adjacent one end of said second stationary power-conductor assembly, an imaginary plane extending through both stationary power-conductor assemblies and also through said pivotally-movable contact means, each of said first and second stationary power-conductor assemblies comprising two or more laterally-spaced stationary rectangularly-shaped power bus-bar elements commonly stationarily mounted relevant to one another, each stationary rectangularly-shaped power bus-bar element in both of said first and second stationary power-conductor assemblies having its wide dimension W disposed in a second imaginary plane, said second imaginary plane being parallel to or coincident with said first imaginary plane, the lateral spacing between the rectangularly-shaped power bus-bar elements in both said first and second stationary power-conductor assemblies providing a desirable ambient venting for the dissipation of heat generated by virtue of the I$^2$R losses in the circuit-closed condition of said circuit-breaker structure, at least two of the laterally-spaced stationary rectangularly-shaped power bus-bar elements of each power conductor assembly extending substantially the entire axial length of its respective stationary power-conductor assembly, and means for pivotally rotating said movable bridging contact means into closed-contacting engagement with said stationary contact means for effecting closure of the electrical circuit through the circuit-breaker structure.

13. The combination according to claim 12, wherein the insulating means comprises a pair of closely-spaced side-by-side post-insulator supports additionally being mechanically rigidly interconnected at at least one end thereof for combined strength and rigidity of support.

14. The combination according to claim 12, wherein the movable pivotally-supported contact means comprises a pair of closely laterally-spaced movable conducting plate portions, each of said movable conducting plate portions being movable in an imaginary plane which is either parallel to or coincident with said first-mentioned imaginary plane.

15. A truck-mounted circuit-interrupting structure adaptable for movement into and out of a cooperating cell structure comprising, in combination, means defining a lower-disposed grounded movable metallic frame-support, wheel-means associated with said grounded metallic movable frame-support for enabling the same to be rolled operatively into and out of a cooperating cell structure, power-conducting means defining upper and lower vertically-spaced generally-parallel stationary first and second power-conductor assemblies, post-insulating means spacing said vertically-spaced first and second stationary power-conductor assemblies apart in spaced generally parallel vertical relationship, both of said stationary first and second power-conductor assemblies extending in generally the same direction, stationary contact means fixedly secured adjacent one end of said first stationary power-conductor assembly, insulating means spacing said first and second stationary power-conductor assemblies apart, movable contact means pivotally supported adjacent one end of said second stationary power-conductor assembly, an imaginary plane extending through both stationary power-conductor assemblies and also through said pivotal movable contact means, each of said first and second stationary power-conductor assemblies comprising two or more laterally-spaced stationary rectangularly-shaped power bus-bar elements commonly stationarily mounted relevant to one another, each stationary rectangularly-shaped power bus-bar element in both of said first and second stationary power-conductor assemblies having its wide dimension W disposed in a second imaginary plane, the second imaginary plane being parallel to or coincident with said first imaginary plane, the lateral spacing between the rectangularly-shaped power bus-bar elements in both said first and second stationary power-conductor assemblies providing a desirable ambient venting for the dissipation of heat generated by virtue of the I$^2$R losses in the circuit-closed condition of said circuit-breaker structure, at least two of the laterally-spaced stationary rectangularly-shaped power bus-bar elements of each power conductor assembly extending substantially the entire axial lenght of its respective stationary power-conductor assembly, and means for pivotally rotating said movable bridging contact means into closed contacting engagement with said stationary contact means for effecting closure of the electrical circuit through the circuit-interrupter.

16. The combination according to claim 15, wherein the insulating means comprises a pair of side-by-side closely-spaced post-insulator supports additionally being mechanically rigidly interconnected at at least one end thereof for combined strength and ridigity of support.

17. The combination according to claim 15, wherein the movable contact means comprises a pair of laterally-spaced conducting plate portions, each of said movable conducting plate portions being movable in an imaginary plane which is either parallel to or coincident with said first-mentioned imaginary plane.

18. The combination according to claim 12, wherein a second insulating means spaces the second stationary power-conductor assembly away from a lower-disposed grounded frame structure.

* * * * *